Figure 1:
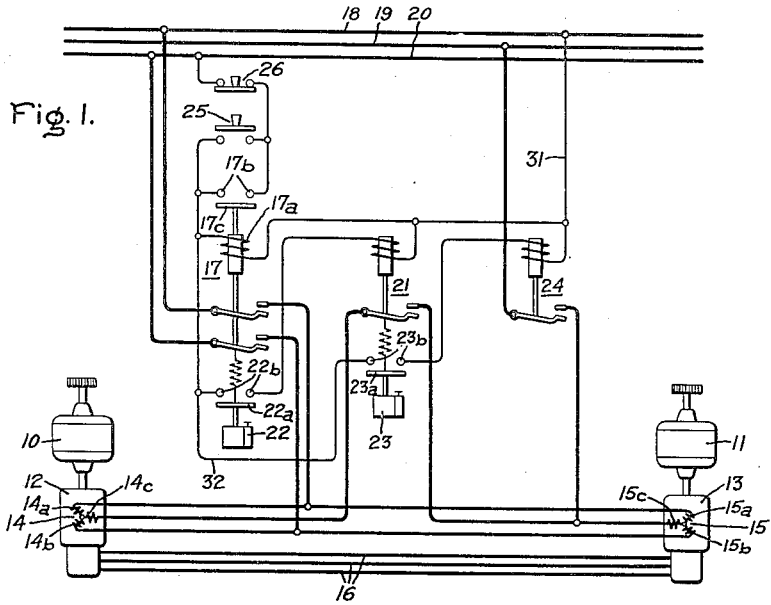

March 16, 1937.  L. M. NOWACKI  2,074,129

SYNCHRONIZING CONTROL SYSTEM

Filed Jan. 4, 1936

Inventor:
Leo M. Nowacki,
by Harry E. Dunham
His Attorney,

Patented Mar. 16, 1937

2,074,129

UNITED STATES PATENT OFFICE 2,074,129

SYNCHRONIZING CONTROL SYSTEM

Leo M. Nowacki, Schenectady, N. Y., assignor to General Electric Company, a corporation of New York Application January 4, 1936, Serial No. 57,588

6 Claims. (Cl. 172—293)

This invention relates to control systems, more particularly to systems for controlling the synchronization of dynamo-electric machines, and it has for an object the provision of a simple reliable and improved system of this character.

Alternating current dynamo electric machines, physically similar to asynchronous type wound rotor induction motors having their primary windings connected to a power source and a secondary winding interconnected, if properly synchronized, will remain in synchronism. Machines connected in this manner may be utilized for maintaining any physically separated devices in synchronism. For example, they may be utilized for maintaining camera and sound apparatus in synchronism. Another example is their use for maintaining asynchronous driving motors at the opposite ends of a lift bridge in synchronism with each other so that the span is maintained level and thereby prevented from jamming in the guides.

There is considerable difficulty in properly synchronizing these machines. The reason for this difficulty is that if the machines are excited from a polyphase source their torque-displacement angle characteristics are asymmetrical with respect to the zero angle or synchronous position. This is better understood by considering the energy relationships involved. If the rotors of the two machines are initially displaced a given angle $a$ from the zero angle or synchronous position and power is supplied to the primary windings, the rotors of the synchronizing motors will be accelerated toward the zero angle position. The energy stored in each rotor is of course a function of the average torque and the angle $a$ through which the rotor rotates to the zero position. As the rotors pass on the other side of the zero position, the stored energy is given up and the rotors decelerate to standstill at a given negative angle $-a'$. Assuming negligible friction, the energy expression for the energy stored on one side of the zero position and given up on the other side must be equal and if the torque displacement curve is symmetrical on opposite sides of the zero position, the rotors will oscillate between $a$ and $-a'$. But, if the torque displacement angle curve is asymmetrical about the zero angle position, the energy stored in the rotors between 180° displacement and zero angle position will be greater than the energy given between zero angle and the $-180°$ position. For large displacements, e. g. displacement angles greater than 90°, the energy stored in the rotors between such angle and zero may be greater than the energy the rotors give up between zero displacement and $-180°$ in which case the rotors will slip a pole and motor action will follow. This, of course, is highly undesirable, because it defeats the object of utilizing synchronizing motors. Accordingly, a further object of the invention is the provision of means for synchronizing the synchronizing motors and at the same time effectively preventing motor action or any tendency thereto.

In carrying the invention into effect in one form thereof, the rotors of a plurality of asynchronous type polyphase alternating current motors are mechanically coupled to the devices which are to be maintained in synchronism. The secondary (rotor) windings of these machines are electrically connected phase to phase. For the synchronizing operation, means are provided for connecting a portion of the primary winding of each synchronizing motor to a source of single phase power together with means for connecting another portion of each of the primary windings together after a predetermined interval of time, and means operable after a second predetermined interval of time for connecting these portions of the windings to another phase of the supply source so that polyphase power is supplied to the primary windings. This insures synchronizing the machine without motoring operation and with a minimum tendency in the direction of this phenomena.

Figure 2:
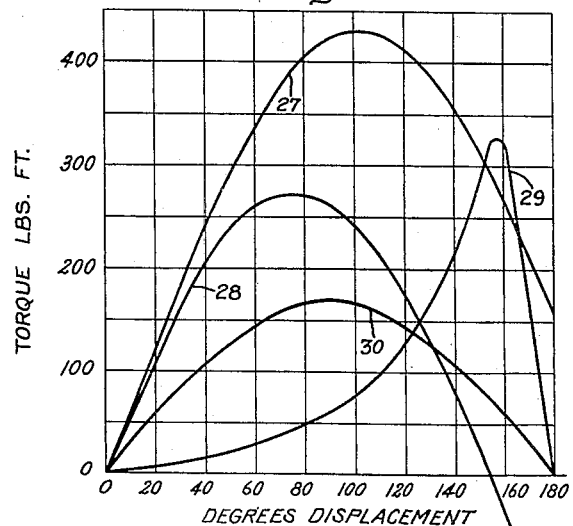

For a better and more complete understanding of the invention, reference should now be had to the following specification and to the accompanying drawing in which Fig. 1 is a simple diagrammatical illustration of an embodiment of the invention as applied to a pair of synchronizing motors each of which is mechanically coupled to one of a pair of drive motors which are utilized for driving some apparatus or object which it is necessary to maintain in synchronism and Fig. 2 is a chart of characteristic curves serving to explain the operation of the invention.

Referring now to the drawing, a pair of electric motors 10, 11 are provided for driving devices or objects which are to be maintained in synchronism. For example it may be assumed, that these motors are coupled to drive the opposite ends of the span of a lift bridge, the ends of which must be operated in unison in order to prevent the span from jamming in the guide. The motors 10 and 11 may be of any desired type and are supplied from a suitable source of power (not shown).

For the purpose of maintaining these driving motors in synchronism with each other, a pair of synchronizing motors 12, 13 are provided. As shown, the synchronizing motor 12 is coupled to the shaft of the driving motor 10 and synchronizing motor 13 is mechanically coupled to the shaft of the driving motor 11. The synchronizing motors are physically similar to polyphase alternating current wound-rotor induction motors. The synchronizing motor 12 has a distributed, three-phase, Y-connected primary winding 14 on a stator member and a similar secondary winding (not shown) on its rotor member. Likewise the motor 13 has a similar primary winding 15 on its stator member and a similar secondary winding (not shown) on its rotor member.

Corresponding terminals of the secondary winding are permanently connected together by means of conductors 16.

Means, illustrated as an electromagnetically operated switching device 17, are provided for connecting two winding legs of each primary winding of the synchronizing motors to one phase of a polyphase supply source represented by the three supply lines 18, 19 and 20. A second electromagnetically operated switching device 21 is provided for connecting the third legs of the primary windings together a predetermined interval of time after the establishment of the single phase connections. The length of this time interval is determined by a suitable time element device, illustrated as a dash-pot 22 actuated by the switching device 17. A second time element device 23, set in operation by switching device 21 and a switching device 24 controlled thereby, are provided for connecting the third legs of the primary windings to another phase of the supply source after a predetermined interval of time so that the synchronizing motors are supplied with three-phase power.

Means illustrated as start and stop switches 25 and 26, of the push button type, are provided for initiating the synchronizing operation and for interrupting the synchronizing power connections respectively.

In the chart of Fig. 2, the relationship between torque and angular displacement of the rotors, herein referred to as the torque-displacement angle characteristic or more simply as the torque curve of the rotors, under the three foregoing conditions of operation is represented by curves 27, 28, 29 and 30. The curves 27 and 28 represent the torque curve when all three phase legs of the primary windings are connected to the source for three phase excitation. For positive displacement angles, the curve 27 may be taken as representing the torque curve for the synchronizing motor 12 and the curve 28 may be taken as representing the torque curve for the synchronizing motor 13. For negative displacement angles the torque curve for motor 12 is similar to curve 28, but inverted and similarly the torque curve for motor 13 is similar to curve 27 but inverted. Since the curves 27 and 28 are obviously different, it follows that the entire torque curve for the full 360° i. e. 180° on each side of the zero angle position, is asymmetrical about this zero angle position. As previously explained, this asymmetry of the torque curve leads to motoring operations under certain conditions.

The curve 29 represents the torque-displacement angle characteristics for either synchronizing motor when two primary winding legs of each motor are connected across one phase of the supply source. For negative angles, this curve is identical but inverted and thus, the curve for the entire 360° is symmetrical about the zero angle position. The curve 30 represents the torque-displacement angle characteristic for either of the synchronizing motors with two primary winding legs connected across one phase of the supply source and the third leg of the primary windings connected together. This curve is also symmetrical about the zero angle axis.

With the foregoing understanding of the apparatus, its operating characteristics and its organization in the completed system, the operation of the system itself will readily be understood from the following detailed description:

The synchronizing operation is initiated by depressing the start button 25 to complete an energizing circuit for the operating coil 17a of the switching device 17 which circuit is readily traced from the lower supply line 20 through the normally closed contacts of the stop button 26, the contacts of the start push button 25 (in the closed position thereof), operating coil of switching device 17 and then by conductor 31 to the supply line 18. The switching device 17 in response to energization of its operating coil, closes its main contacts to connect the legs 14a and 14b and the legs 15a and 15b of the primary windings of the synchronizing motors to one phase 18, 20 of the supply source. In the closed position of switching device 17, the upper stationary contacts 17b are bridged by the movable contact member 17c to complete a holding circuit for the operating coil independent of the contacts of the start push button, which may now be released. If the rotors of the synchronizing motors are displaced any angle between 100° and 175°, the magnitude of the torque as indicated by the curve 29 will be sufficient to rotate the rotors of the two motors toward the zero angle or synchronous position. Since this curve, as explained in the foregoing, is symmetrical about the zero angle position, there will be no tendency toward motoring action. On the contrary, the rotors may oscillate several times about the zero angle position, but these oscillations will be damped by the friction of the drive and in a very short interval of time, the rotors will be locked in synchronism.

It will be noted, however, that if the rotors are initially displaced by an angle less than 100°, the magnitude of the torque as shown by curve 29 for angles of less than 100° is so low that it will probably be insufficient to synchronize the rotors of the synchronizing motors. This will be especially true if the friction of the drive and the inertia of the apparatus to which the synchronizing motors are connected are large. However, after a predetermined interval of time determined by the setting of the dashpot 22, the movable contact member 22a bridges the stationary contact members 22b to complete an energizing circuit for the operating coil of the switching device 21 which is traced from the lower supply line 20 through the normally closed contacts of stop button 26, upper auxiliary contacts 17b, contacts 22b, bridged by a contact member 22a, operating coil of switching device 21 and thence by conductor 31 to the upper supply line 18.

Switching device 21 closes its main contacts to connect the third legs 14c and 15c of the primary windings of the synchronizing motors together. Therefore, if the rotors of the two synchronizing motors have not been synchronized by the single phase connections owing to the insufficiency of the torque for angles between zero and 100°, the torque with two winding legs of each primary winding connected across one phase of the supply source and the third winding leg connected together by the switch 21 will be sufficiently great for angles between zero and 100° to pull the rotors into synchronism. As previously stated, the curve 30 which represents the torque displacement angle characteristic when the primary windings are connected in this manner is symmetrical about the zero angle position and consequently there is no tendency toward motoring action, but on the contrary, the rotors are quickly synchronized after several oscillations of rapidly diminishing magnitude.

After a predetermined interval of time determined by the setting of the dash-pot 23, the movable contact member 23a is pulled into engagement with the stationary contacts 23b to complete an energizing circuit for the operating coil of the switching device 24. This circuit is readily traced from the lower supply line 20 through the contacts of the stop push button 26 and the auxiliary contacts 17b and thence by conductor 32 through contacts 23a, 23b of the time delay device, and through the operating coil of the switching device 24 to the upper supply line 18. The switching device 24 closes in response to the energization of this operating coil and connects the third winding legs 14c and 15c to the middle supply line 19. The primary windings of the synchronizing motors are now connected to the three phase source for three phase excitation and operation and from this point on, the torque displacement angle characteristic of the synchronizing motors is in accordance with either one of the curves 27, 28 depending upon the direction in which subsequent loads may tend to pull the two synchronizing motors out of synchronism. Since the synchronizing motors are properly synchronized before the three phase connections are finally established, the possibility of motoring action or any tendency thereto as a result of operating conditions explained in the foregoing are practically non-existent.

Thus, it will be seen that if the rotors are displaced from each other by a large angle, the first step, i. e. the single phase connection is very effective in synchronizing the rotors. On the other hand if the rotors are within the range of displacement in which the single phase torque is ineffective, the second step, i. e. the single phase connection with the third winding legs connected to each other produces a sufficient torque for synchronizing the rotors. The torque displacement characteristics for both the first and second steps is substantially symmetrical on both sides of the zero angle position and consequently there is substantially no tendency toward motoring action. After the rotors have been brought into synchronism as a result of the synchronizing torque produced by the first and second steps, the three phase connections are completed and the rotors remain in synchronism throughout the succeeding operations of the apparatus.

When it is desired to deenergize the synchronizing motors, the stop button 26 is depressed to interrupt the energizing circuits for the switching devices 17, 21 and 24. Interruption of these energizing circuits causes these switches to open their contacts and leave the synchronizing motors in the open and deenergized conditions in which they are illustrated in the drawing.

Although in accordance with the provisions of the patent statutes, this invention is described as embodied in concrete form, it will be understood that the elements and connections shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. In combination, a polyphase source of power, a pair of dynamo-electric machines each having a pair of inductively related windings, electrical connections between a winding of one of said machines and a winding of the other of said machines, means for supplying single phase power to a portion of each of the other windings of said machines comprising means for connecting said winding portions to one phase of said source, means for connecting another portion of each of said last-mentioned windings together independently of said source, and means for supplying polyphase power to said last-mentioned windings.

2. In combination, a polyphase source of power, a pair of dynamo-electric machines each having a polyphase primary winding and a secondary winding, electrical connections between said secondary windings, means for establishing single phase connections between a portion of each of said primary windings and said source, means responsive to establishment of said single phase connections for connecting another portion of each of said primary windings together independently of said source, and means responsive to the establishment of said independent connection for completing polyphase connections between said primary windings and said source.

3. In combination, a pair of dynamo-electric machines each having a polyphase primary winding and a secondary winding, electrical connections between said secondary windings, means for supplying single phase power to a portion of each of said primary windings, means for connecting another portion of each of said primary windings together after an interval of time, and means for supplying polyphase power to said primary windings after a second time interval.

4. A control system comprising a pair of dynamo-electric machines each having a polyphase primary winding and interconnected secondary windings, means for connecting a portion of said primary windings to one phase of a polyphase source, means for connecting another portion of each of said primary windings together after a time interval, and means for connecting said other portions to another phase of said source so that polyphase power is supplied to said primary windings.

5. A synchronizing control system comprising a pair of dynamo-electric machines having polyphase primary windings and interconnected secondary windings, means for connecting a plurality of legs of said primary windings to one phase of a polyphase source, time element means and means controlled thereby for connecting another leg of the primary winding of one of said machines with a corresponding leg of the primary winding of the other of said machines after a predetermined interval of time, and a second time element device and means controlled thereby for connecting said last-mentioned winding legs to another phase of said source whereby polyphase power is supplied to said primary windings.

6. A synchronizing control system comprising in combination, a pair of wound rotor induction motors having three phase primary windings and interconnected secondary windings, a switching device for connecting two phases of each of said primary windings across one phase of a three phase power source, a time element device set in operation by said switching device and means controlled thereby for connecting the third phases of said primary windings together after a predetermined interval of time, and a second time element device set in operation by operation of said last-mentioned means and means controlled by said second time element device for connecting said third phases to the third phase of said source so that polyphase power is supplied to said motors.

LEO M. NOWACKI.